D. C. TALBOT.
Calipers.
No. 37,531.
Patented Jan. 27, 1863.
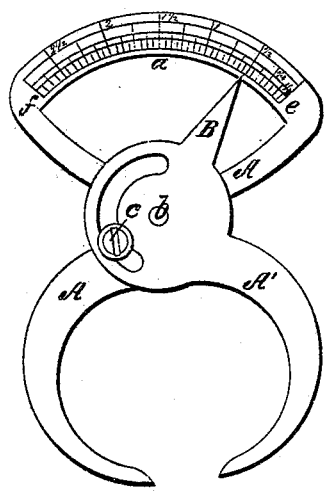 
Witnesses:
George W Fairfield
Erastus Kies
Inventor:
David C Talbot

UNITED STATES PATENT OFFICE.

DAVID C. TALBOT, OF WORCESTER, MASSACHUSETTS.

IMPROVEMENT IN CALIPERS.

Specification forming part of Letters Patent No. 37,531, dated January 27, 1863.

*To all whom it may concern:*

Be it known that I, DAVID C. TALBOT, of Worcester, in the county of Worcester, in the State of Massachusetts, have invented a new and Improved Mode of Constructing Calipers and Dividers; and I do hereby declare that the following is a full and exact description thereof, reference being had to the accompanying drawings, and to the letters of reference marked thereon.

Figure 1 is a front elevation of a pair of calipers, and Fig. 2 is an edge view of the same.

The nature of my invention consists in providing calipers and dividers with a graduated scale and indicator, arranged in such a manner that the measurement of any article can be ascertained by the indicator pointing to the figures on the graduated scale.

That others skilled in the art may make and use my invention, I will proceed to describe its construction and operation.

I cut the part A from sheet metal, also the part A', and rivet them together by pin or rivet $b$, having a set-screw, $c$, which screws into the part A, while the head or shoulder comes in contact with the part A', and as the screw $c$ is tightened the instruments are secured at any required opening. The part $a$ of A is made in a circular form, and is spaced off and marked to represent inches and parts of inches, from $e$ to $f$. The part A' is provided with a hand or indicator, B, which points to the number of inches or parts of inches on the scale, registering accurately the distance the arms are apart, thereby saving the application of a measure when the dimensions of any article is wished to be obtained.

The arms of dividers or calipers may be made in any of the known forms for either inside or outside measurement.

Having fully described my invention, what I claim therein as new, and wish to secure by Letters Patent, is—

1. The method of applying a graduated scale or measure attached to calipers or dividers, substantially as described.

2. The movable hand or indicator B, attached to or moved by the arms of calipers or dividers, substantially as specified.

DAVID C. TALBOT.

Witnesses:
 GEORGE W. FAIRFIELD,
 ERASTUS KRIS.